US006961736B1

(12) United States Patent
Amirghodsi

(10) Patent No.: US 6,961,736 B1
(45) Date of Patent: Nov. 1, 2005

(54) COMPACT COLOR FEATURE VECTOR REPRESENTATION

(75) Inventor: Sohrab Amirghodsi, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 401 days.

(21) Appl. No.: 10/157,954

(22) Filed: May 31, 2002

(51) Int. Cl.$^7$ ............................................. G06F 17/30
(52) U.S. Cl. .................................. 707/104.1; 382/173
(58) Field of Search ............................. 707/104.1, 101, 707/102, 103, 6, 100; 382/240, 180, 162, 382/181, 232

(56) References Cited

U.S. PATENT DOCUMENTS

| | | | |
|---|---|---|---|
| 6,345,275 B2 * | 2/2002 | Lee ................................ | 707/6 |
| 6,594,389 B1 * | 7/2003 | Murching .................... | 382/173 |
| 6,606,417 B1 * | 8/2003 | Brechner .................... | 382/240 |
| 6,732,119 B2 * | 5/2004 | Ganapathy et al. ....... | 707/104.1 |
| 6,748,398 B2 * | 6/2004 | Zhang et al. ............ | 707/104.1 |
| 6,792,434 B2 * | 9/2004 | Moghaddam et al. .... | 707/104.1 |

FOREIGN PATENT DOCUMENTS

| | | | | |
|---|---|---|---|---|
| EP | 1193648 | * | 7/2001 | ............ G06T 7/20 |

OTHER PUBLICATIONS

M. J. Swain and D. H. Ballard, 'Color Indexing,' Intl. Journal of Computer Vision, vol. 7, No. 1, pp. 11-32, 1991.
M. Stricker and M. Orengo, 'Similarity of Color Images,' Poc. of SPIE Conf. On Storage and Retrieval for Image and Video Databases III, San Jose, CA, 1195, vol. 2420, pp. 381-392.
W. Niblack, R. Barber, W. Equitz, M. Flickner, and others, 'The QBIC Project: Querying Images By Content Using Color, Texture, and Shape,' in Proc. of SPIE, Storage and Retrieval for Image and Video Databases, vol. 1908, San Jose, CA, pp. 173-187, Feb. 1993.
J.R. Smith and S. F. Chang, 'Local Color and Texture Extraction and Spatial Query,' IEEE Int. Conf. On Image Processing, vol. , p. 1011-1014, Lausanne, Switzerland, Sep. 1996.
C. E. Jacobs, A. Finkelstein, and D. H. Salesin, 'Fast Multiresolution Image Querying,' Computer graphics proceedings of SIGGRAPH, pp. 278-280, Los Angeles, 1995.
James Ze Wang et al., 'Wavelet-Based Image Indexing Techniques with Partial Sketch Retrieval Capability,' Proc. 4$^{th}$ ADL Forum (ADL '97), Washington, D.C., May 1997.

* cited by examiner

Primary Examiner—Srirama Channavajjala
Assistant Examiner—Yicun Wu
(74) Attorney, Agent, or Firm—Fish & Richardson P.C.

(57) ABSTRACT

Methods and apparatus for representing images using a compact color feature vector. A color feature vector includes a color element for each color in an image-specific set of colors. A color element includes a color identifier and a relative color occurrence. A compact color feature vector may be used in a content-based image retrieval (CBIR) system. The CBIR system includes an image data store containing multiple images. A color feature vector data store includes a variable-length color feature vector for each image in the image data store. A computer program receives a query and uses the variable-length color feature vectors in the color feature vector data store to identify which images satisfy the query.

38 Claims, 4 Drawing Sheets

COMPACT COLOR FEATURE VECTOR REPRESENTATION

BACKGROUND

This disclosure relates to color feature vectors used in content-based image retrieval.

A content-based image retrieval ("CBIR") system retrieves images from a database based on the content of an image. For example, some CBIR systems allow users to provide a representative query image. The system uses the query image to retrieve images from a database having similar content. Typically, image comparisons are based on image content, i.e., objective features of the image, such as, color composition, texture, or lighting. For example, a CBIR system may retrieve images having similar color composition, similar textures, similar lighting, or any other feature of image content.

There have been two major categories of CBIR applications: (i) image libraries and (ii) image recognition and categorization systems. Image libraries may be used, for example, to retrieve images for use in publications. A user may identify a query image and retrieve all images having similar colors. For example, an editor may have a picture of children playing in the surf at a beach. Desiring additional photography, the editor may query a CBIR image library to find additional beach pictures.

CBIR also may be used in image recognition or categorization systems. For example, a CBIR system has been used to classify images of tissue samples taken through a microscope. The system searches an image database to help diagnosis prostate cancer. Typically, an image recognition or categorization system extracts a representation of the features of an image and searches a database of images to find images having similar features. The image then may be categorized based on the search results.

Fixed-size color histograms have been used to represent the color information of images. In a fixed-size color histogram system, the colors of an image are mapped into a discrete color space containing n predetermined colors selected without regards to the image. A color histogram H is a vector $(h_1, h_2, \ldots h_n)$ in an n-dimensional vector space, where each element $h_j$ represents the number of pixels of color j in the image. To compare two histograms $H_1$ and $H_2$, one can use conventional techniques such as the L1-norm as discussed in the following papers: Swain, M. J. and D. H. Ballard, "Color Indexing," International Journal of Computer Vision, 7 (1), pp. 11–32 (1991); Funt, B. V and G. Finlayson, "Color Constant Color Indexing," IEEE Transactions on Pattern Analysis and Machine Intelligence, 17 (5), pp. 522–529 (May 1995); and Striker, M. and M. Orengo, "Similarity of Color Images," Proceeding of SPIE Conference on Storage and Retrieval for Image and Video Databases III, San Jose, Calif., Vol. 2420, pp. 381–92 (1995).

Additionally, an L2-norm may be used to compare vectors $H_1$ and $H_2$, as discussed in the following papers: Niblack, W., R. Barber, W. Equitz, M. Flickner, et al., "The QBIC Project: Querying Images by Content Using Color, Texture, and Shape," Proceeding of SPIE, Storage and Retrieval for Image and Video Databases, Vol. 1908, San Jose, Calif., pp. 173–187 (February 1993); and Hafner, James L., Harpreet S. Sawhney, William Equitz, Myron Flickner, Wayne Niblack, "Efficient Color Histogram Indexing for Quadratic Form Distance Functions," IEEE Transactions on Pattern Analysis and Machine Intelligence, 17 (7), pp. 729–736 (1995).

An alternative approach to the use of color histograms is the use of wavelet coefficients. This technique was pioneered by C. E. Jacobs as described in the following paper: Jacobs, C. E., A. Finkelstein, and D. H. Salesin, "Fast Multiresolution Image Querying," Computer Graphics Proceedings, SIGGRAPH, pp. 278–80 (Los Angeles 1995). Jacobs uses coefficients quantized to −1, 1, and 0. Wavelet representations of image content, however, generally vary when an image is transformed by translations, rotations, or scale changes. Thus, a CBIR system using wavelet analysis techniques may have difficulties finding similarities between images that are simple rotations or reflections of one another.

SUMMARY

In one general aspect, a content-based image retrieval system is provided. The CBIR system includes an image data store containing multiple images, a color feature vector data store, and a computer program that receives a query and identifies images from the image data store that satisfy the query. The color feature vector data store includes a variable-length color feature vectors for each of the multiple images.

Advantageous implementations may include one or more of the following features. Color feature vectors may be compact and their length may be determined by the color complexity of the represented image. For example, color feature vectors may use on average 48 bits to store color information.

Additionally, the system may include a global color table with the color identifier referencing a color in the global color table. The global color table may be calculated from a sample image data store by quantizing images in the sample image data store to determine a set of quantized image colors. Then, colors may be selected to minimize error across the sample image data store. The global color table may be calculated from the image data store or a generic global color table that is non-specific to the image data store may be used.

Typically, the color occurrence identifies the relative occurrence of colors in the image similar to the color represented by the color identifier. Color similarities maybe computed by calculating vector distances. In some implementations, colors in the image correspond to selected colors in the color feature vector. The color feature vector may include a 9-bit field for each color identifier and a 7-bit field for each relative color occurrence.

In another general aspect, a system is provided including an image data store with multiple images and a feature vector for each image in the image data store describing the relative frequency of prominent colors occurring in a color quantized representation of the image.

Implementations may include a color table associated with the image data store where the color table identifies colors to be used in describing color features of images. Each of the prominent colors can be mapped to a color in the color table. Feature vectors may be variable-length based on colors in the image. The image data store may be implemented as an image database.

In another general aspect, color feature vectors may be created for an image by quantizing the image to an image-specific number of distinct colors, determining the relative occurrence of each of the colors in the quantized image, and creating a color feature vector using the relative occurrences of each of the colors in the quantized image.

In some implementations, quantizing the image includes determining the image-specific number of distinct colors in the image. This may be done using a fuzzy binary search and/or a linear search.

A linear search may be performed by initializing the number of colors, and until a number of distinct colors is determined, quantizing the image for the number of colors using a median-cut color quantizer, calculating an error value for the resulting quantized image, and updating the number of distinct colors. Once the error value falls outside a predetermined threshold, the number of distinct colors can be determined based on the value of the number of colors. Initializing the number of colors may be performed by setting the number of colors to a predetermined maximum.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
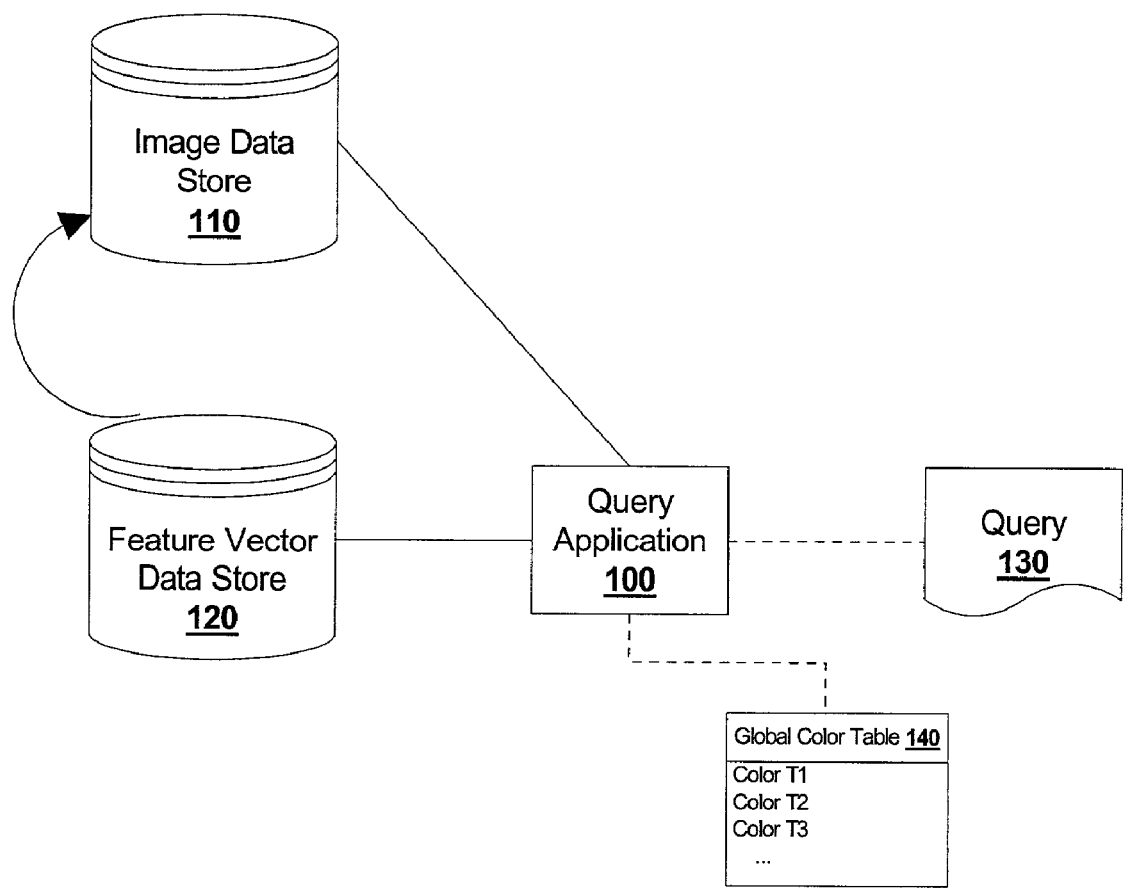
FIG. 1 is a block diagram of a content-based image retrieval system.

As shown in FIG. 1, a content-based image retrieval system includes a query application 100, an image data store 110, a feature vector store 120, and a global color table 140. In operation, the query application 100 receives a query 130 from, for example, a user or another software application. The query typically includes a representative image. For example, a user may wish to identify images in the image data store 110 that are similar to the representative image.

The query application 100 uses the query 130 to identify feature vectors in the feature vector data store 120 that correspond to the query 130. For example, the query application 100 may identify feature vectors specifying color compositions similar to the color composition of the query 130. Feature vectors from the feature vector data store 120 are associated with images in image data store 110 and can be used to retrieve images related to the query 130 from the image data store 110.

Query application 100 can be implemented using conventional programming languages and software development techniques. In one implementation, query application 100 is a standalone application written in C++. It has graphical user interface functionality and the backend query functionality integrated in a single application. In another implementation, a client-server model is used. The image data store query features are provided by a server application written in C++. A variety of user interfaces may be provided to access the server application., such as, web-based user interface modules and standalone Java modules.

Images in image data store 110 are evaluated with respect to query 130 by creating vector representations of the features of the images. The techniques described below use an improved color feature vector representation that provides a quick (in terms of speed) and efficient (in terms of memory requirements) mechanism to compare various features of images with no artificial size restrictions on feature vector size.

One way to increase the speed of a CBIR system is to reduce the size of feature vectors, thus reducing the memory requirements and reducing the computational resources needed to search an image store. A human observing numerous images in an image store may notice that the color information of most images can be defined by a few prominent colors. For example, in an image of a beach at sunset, the colors of the sand, sun, and sky dominate. Other colors are present; however, the overall character of the image may be represented with a small number of colors. This human cognitive process is mimicked by a CBIR system that uses a compact color feature vector describing a number of prominent colors in the image, which is thus enabled to compare two features in a speedy manner. A CBIR system includes compact color feature vectors, if the feature vectors describing images in a large image database (e.g., over 50,000 images) include on average less than 3 colors per image.

When using conventional histogram color feature vectors in a CBIR system with a large image data store, the size of the feature vector data store is often too large to keep in random access memory. By using compact color feature vectors described below, the size of the feature vector data store may be reduced, such that the entire data store may be kept in memory, in many CBIR applications, thus increasing the performance such that queries may be performed quickly without having to retrieve feature vectors repeatedly from disk. To do this, the size of the feature vector database must remain as compact as possible. Additionally, the size of feature vectors becomes more critical as the database size increases, as one introduces region of interest ("ROI") searching to the system, or combination of both.

The techniques described here provide a compact representation of image features. This representation can be used to increase the speed and efficiency of CBIR systems. Compact feature vectors describe prominent colors in images using a rich, variable length feature vector. In an exemplary implementation, the compact feature vectors used on average less than 3 colors for each image (roughly 2.8 distinct colors for a diverse database of over 50,000 images). This figure is due to the color complexity of the images in the image database. This variable length feature vector increases scalability of the systems in which it is used due to its small size. In addition, smaller feature vectors allow a more sophisticated distance function to be employed during score computation.

Figure 2:
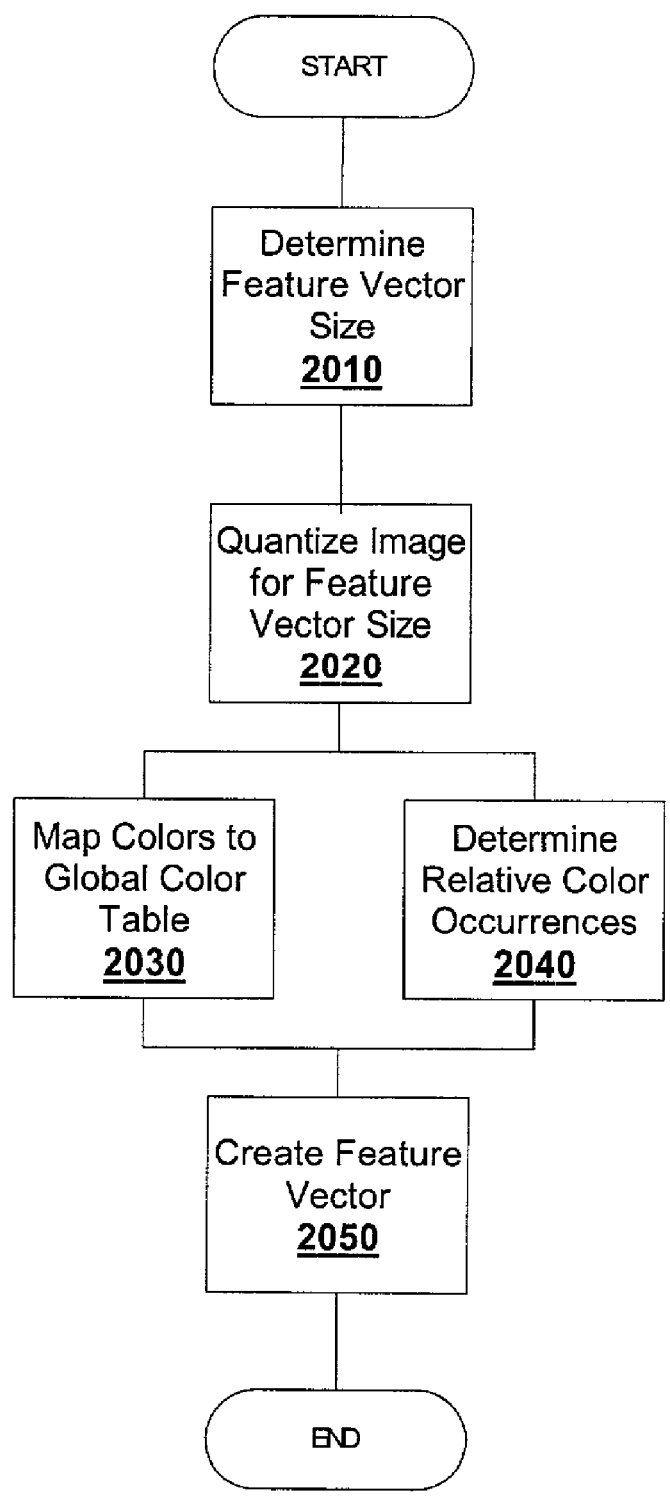
FIG. 2 is a flow chart describing a method for generating a compact feature vector representation that may be used in a content-based image retrieval system.

As shown in FIG. 2, a compact color feature vector describing an image can be created by first determining an image-specific feature vector size (step 2010). The size of the feature vector is chosen such that the vector is as compact as possible while retaining sufficient descriptive capabilities. One way to determine the feature vector size is to begin at a maximum feature vector size. The size of the feature vector is determined by the number of colors represented by the feature vector. The image is quantized for the maximum number of colors using, for example, a median-cut color quantizer. Color quantization maps an original full color image to an image with a small color palette. For example, the Heckbert median cut algorithm may be used for this purpose. Paul Heckbert, "Color image quantization for frame buffer display," ACM Computer Graphics, pp. 297–304 (1982).

The error or rate distortion between the quantized image and the original image is then measured. If the error is an unacceptable value, the maximum size is used. If the error is acceptable, the size is successively reduced and the quantization and error measurement are repeated until further reduction the error reaches an unacceptable value, at which point the previous size is used. For example, in a CBIR system, the maximum number of colors represented in a feature vector size may be set to 16 colors. In this system, the feature vector size for a particular image may be determined by attempting 15 colors, then measuring the error. If the error is greater than a predetermined threshold, then 16 colors will be used to describe the image features; otherwise, the system successively attempts 14, 13, 12, . . . , and so on, until the error threshold is crossed. Thus, the number of colors described by the feature vector, in this example, will never be more than 16. The peak signal-to-noise ratio (PSNR) may be used to measure error. For example, the maximum PSNR may be set to 25. In an experiment using a PSNR of 25, the inventor computed compact color feature vectors on a large data store of over 50,000 diverse sample images and found that only an average of 2.8 colors were used for each image.

Once the size is determined, the image quantized for that size is obtained (step 2020), either from a copy kept of the last quantized image that had an acceptable error, or from quantizing the image again. Any conventional image quantization procedure can be used. If only 6 colors are needed to represent the image, then the image is quantized to 6 colors (i.e., the image is modified so that only 6 colors are used). Colors identified in this way will be referred to as the prominent colors of the image.

As described above, the image was quantized in determining the appropriate number of colors. The quantized image may be stored in a memory so that additional quantization is unnecessary. The quantized image colors are then mapped to colors found in a global color table (step 2030). The mapping can be performed by simply determining the closest color in the global color table to each of the colors in the quantized image. The system also determines the relative color occurrence of each color in the quantized image (step 2040). For example, if the quantized image contains three-quarters blue and one-quarter red pixels, then the relative color occurrences may be represented as 0.75 and 0.25 respectively.

Finally, the color feature vector (step 2050) is created using identifiers of colors in the global color table determined in step 2030 and the relative color occurrences identified in step 2040. The number of colors represented by the color feature vector is determined by the color complexity of the image. The color complexity of the image is not necessarily determined by the number of different image colors; quantizing the image reduces the number of colors used, perhaps reducing hundreds of shades of a particular color to a single color. The color complexity of an image determines the number of different colors that will be needed to represent the image without introducing significant difference between a quantized image and the original image. The color feature vector only represents the prominent colors of an image based on the complexity of the image. For example, a color feature vector corresponding to one image may only have values for 2 colors, while a color feature vector corresponding to another image may have values for 7 colors, depending on the color complexity of the images. The size of these color feature vectors is thus determined by an image's color complexity.

Figure 3:
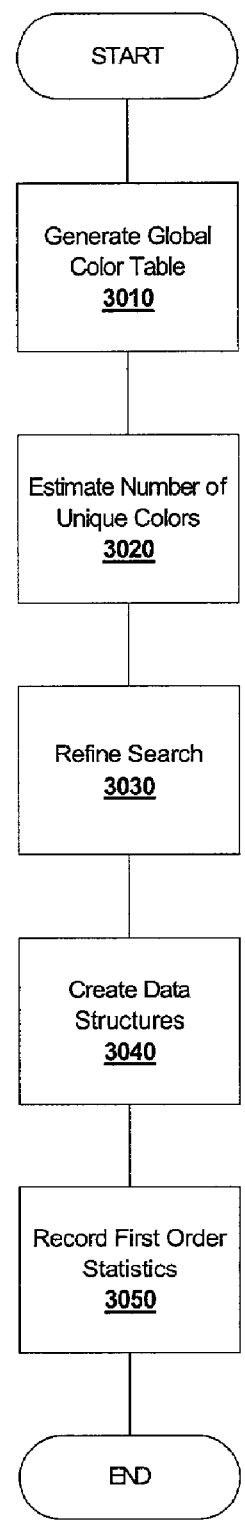
FIG. 3 is a diagram illustrating the mapping of image colors to a global color table.
Figure 4:
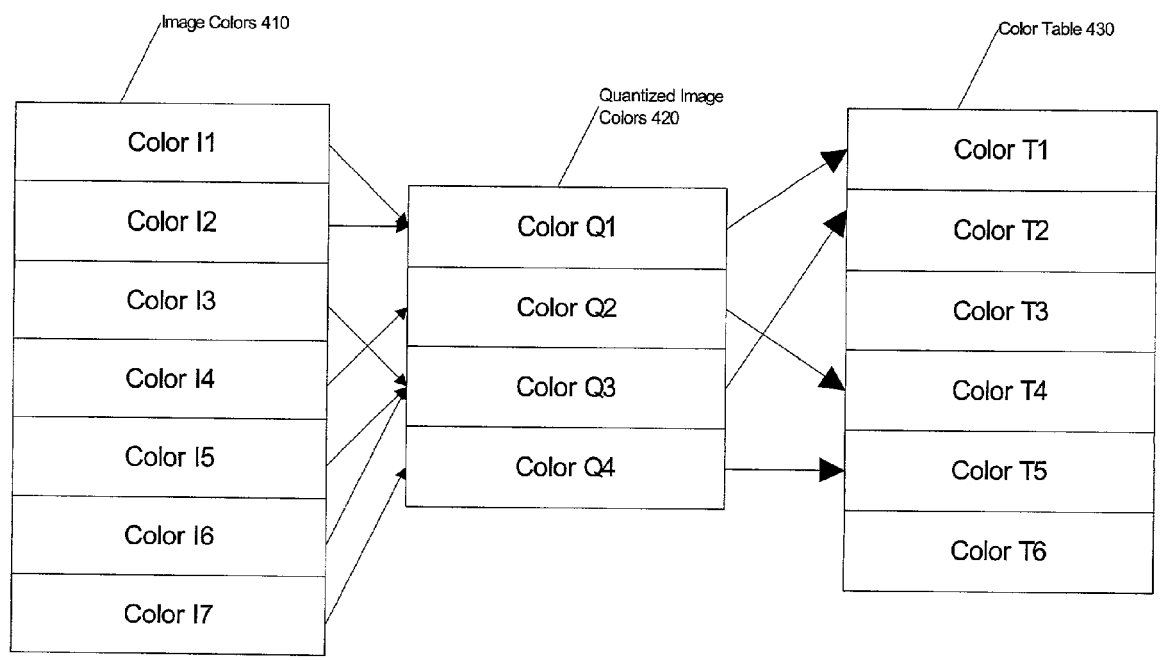
FIG. 4 is a flow chart describing a method for generating a compact feature vector representation of an image.

FIG. 3 shows one particular implementation for computing compact color feature vectors in a CBIR system. A compact color feature vector describing an image is created by first generating or identifying a global color table (step 3010). The global color table can be fixed or computed, based on individual databases. Typically, global color tables are computed for each image data store; however, fixed global color tables also can be used. For example, a CBIR system can use the 216 web-safe colors as the global color table. Additionally, a color table created for another image data store, or a generic color table can be used. While any color table can be selected, a color table optimized for images in an image data store will generally provide improved results.

Typically, a global color table is generated by applying conventional vector and color quantization algorithms over an entire image database, computing a global codebook that minimizes the mean standard error over the entire database. For example, a tree vector quantizer in conjunction with a median-cut color quantizer can be used to generate the color table by first quantizing all the images in the database to meet some rate distortion criteria. Once all the images are quantized to a small number of colors using the techniques described above, a vector quantizer can be used to generate a color table that minimizes the error over the entire database. In the absence of a database-specific color table, a default color table can be used. The default color table can be a generic color table created by selecting wide range of images and processing a large number of samples.

Once the global color table has been identified or generated, the next step is to determine the number of colors that will be used in the compact variable-length feature vector. The number of distinct colors in the image is estimated (step 3020) by performing a fuzzy binary search to determine the number of colors needed using a median-cut color quantizer. The fuzzy binary search evaluates a given number of distinct colors by quantizing the image for the given number of distinct colors and comparing the quantized image to the original image. The comparison determines a value in a fuzzy set describing the compared quantized image to the original image. For example, in some implementations the fuzzy set includes the following: "excellent;" "good;" "medium;" or "poor." The fuzzy search continues as a conventional binary search until the quantized image is close is close enough to the original image. For example, the fuzzy search may continue until a "good" match is found. In performing a fuzzy binary search, the goal is not to achieve the optimal size, instead, the goal is to determine a size that falls meets the fuzzy criteria. For example, a particular image may optimally be represented by 2 colors. A fuzzy binary search may determine that a color feature vector describing 4 colors provides a "good" match. The fuzzy binary search ends when the fuzzy criteria is met instead of when the optimal result is identified.

In essence, this step solves a traditional O(n) optimization problem in log(n) time, and consequently can be run in a very reasonable time. By the time this algorithm terminates, the system has determined a rough estimate of number of colors needed to meet the desired rate distortion criteria.

Once an estimate of the number of distinct colors needed has been made, the estimate can be refined using the algorithm shown in Table 1 (step 3030). The estimate is refined by decreasing the number of colors, one at a time, checking the PSNR against an error threshold.

TABLE 1

```
=> NumberOfColors ← EstimatedNumberOfColors
=> LOOP
    => RUN Median-Cut Color Quantizer
    => IF (PSNR(NumberOfColors) within Threshold)
    => THEN
        => NumberOfColors ← NumberOfColors + 1
        => BREAK % Previous NumberOfColors Correct; Exit Loop
    => NumberOfColors ← NumberOfColors - 1
=> END LOOP
```

As shown in Table 1, the estimated number of colors calculated in step 3020 is used to initialize the "NumberOfColors" variable. This is estimate is refined by successively decreasing the number of colors, executing a median-cut color quantizer, and calculating the resulting error. Alternatively, the number of colors may be determined by beginning with a single color, measuring the PSRN for that number of colors, and increasing the number of colors used until the PSRN is within a threshold. The two-part process discussed above with reference steps 3020 and 3030 to determine a compact feature vector size provides an efficient computation mechanism; however, a size can be determined in other ways. For example, linear search can be used, as described above in reference to step 2010 of FIG. 2, without the first step of estimating a compact feature vector size. That is, the system successively increases or decreases the number of colors, performs color quantization, and re-computes the PSNR until the error is within a tolerable range. This technique has O(n) complexity, i.e., it is linear in time with respect to the ultimate number of colors computed.

Alternatively, the compact feature vector size can be calculated with O(log (n)) complexity using a binary search inspired algorithm. This algorithm starts from some maximum allowable colors and logarithmically reduces the search space (i.e., number of colors) as described above in reference to step 3020. Thus, implementations may use a linear algorithm, such as step 3030; a logarithmic algorithm, such as step 3020; or a combination of a logarithmic algorithm that is refined by a linear algorithm, such as the combination of steps 3020 and 3030.

Once the number of colors has been decided, a non-linear filter (e.g., a median filter) can optionally be applied to the color-quantized image. The non-linear filter removes small color segments and eliminate insignificant sections (i.e., noise) in the image while preserving border information and avoiding the introduction of new colors. Thus, the non-linear filter may be used to better identify the prominent colors of the image.

After the number of colors to be used to represent the image has been determined, the image is quantized. Then, the quantized image colors are mapped to the global color table (step 3040). This can be done by building a series of inverse color tables as follows: (1) an inverse table that maps indices from the original image color space to indices in the color table of the color-quantized image; and (2) an inverse table that maps indices from the color table of the color-quantized image to the indices of global color table.

Using the inverse color tables, the system records first order statistics for each resultant quantized color (step 3050) by recording the probability distribution for each resultant quantized color. These probabilities are computed by dividing the total pixels for each index by the total pixels in the image.

Once step 3050 has been completed, an additional step may be performed to reduce the amount of information stored by the system. If a color only occurs in a small number of image pixels, the color's occurrence provides little value in characterizing the features of an image. Thus, some implementations include a final filtering stage, dropping all image colors occurring in less than a threshold number of pixels, thereby leaving only features of widely occurring colors of the image. The threshold may be set as a percentage of the total number of pixels in the image. For example, a threshold of 5% would remove all colors representing less than 5% of all of the image pixels.

The quantized image colors 420 decreases the amount of information needed to describe the color features of an image; however, this representation may be improved through the use of color table 430. In this example, color table 430 includes only 6 colors. Each of the quantized image colors 420 is mapped to the closest color in color table 430. The closest color may be determined using any conventional technique. For example, each color may be represented by a vector of the constituent components of red, green, and blue. The distance between two colors may be calculated by computing the vector distance between the vector representations of the two colors. Conventional vector comparison techniques may be used, such as, computing the L1- or L2-norm. Additionally, a colormetric color space may be used such that the calculated distance in space corresponds to perceived differences in color.

In this example, quantized image color Q1 is mapped to color table color T1, Q2 to T4, Q3 to T2, and Q4 to T5. Colors in color table 430 may be represented by their index within the table. Since the table has only 6 colors in this example, only 3 bits are needed to represent each color. If the color table were not used, then the quantized colors could be stored using any conventional color representation, such as a red-green-blue (RGB) representation of three 8-bit numbers. Thus, each color in a color feature vector would require 24 bits to identify the color. Using indexed colors, each vector requires far fewer bits for each color in the feature vector. Using the techniques described above on a database of over 50,000 sample images, only 2.8 colors were used on average per individual image. This reduced size significantly improves the ability for a CBIR system to store feature vector databases in memory and increases the feasibility of ROI searching.

The resulting color feature vector can be provided in a data structure. The data structure can include a link to the represented image such that the image can be obtained from the image data store. For example, the link can include a reference to the filename of the represented image, or a distinct identifier of the image.

In addition, the color feature vector includes a color descriptor for each of the colors described. A color descriptor includes a color index and the relative frequency of occurrence of the color in the quantized image. The color index may identify colors in any manner. For example, the color index may be an RGB color identifier, or the index may simply reference the location of the color within a color table. In a preferred implementation, the color index references the location of the color within the global color table. Because the color table is limited in size, the index to a color in the color table is typically much smaller than other representations of the same color.

The relative frequency of the occurrence of the color in the image is typically represented using as a percentage. Because colors insignificant colors may be filtered out as discussed above, the sum of all color occurrences may not equal 100%. For example, an image may include hundreds of red shades, each quantized to a single red. This single red color is mapped to the global color table and the index of that color in the global color table is recorded as the color index. The relative occurrence of the single red color in the quantized image may be recorded as a percentage, such as, 18.3% or 0.183.

Consider, for example, an image of a meadow on a sunny day having a few dozen shades of green due to the angle or direction of lighting. The system above may determine that the image may be represented using 4 different shades of green as shown in the table below.

TABLE 2

| Region | Relative Occurrence |
|---|---|
| Green 1 | 80% |
| Green 2 | 18.5% |
| Green 3 | 0.7% |
| Green 4 | 0.8% |

The least occurring colors, Green 3 and Green 4, represent only 1.5% of the image, while Green 1 and Green 2 represent 98.5% of the image. In this case, the less frequent colors may be dropped without significantly reducing the descriptiveness of the resulting color feature vector. If colors are dropped, the sum of the relative occurrences may not total 100%.

The color descriptors may be stored in the color feature vector data structure in any conventional format, for example, the color feature vector data structure may include a field identifying the length of the color feature vector, along with color descriptor for each of the colors represented. For example, a 16-bit field may be used to store a color descriptor with 9 bits identifying an index within a color table and 7 bits identifying the relative occurrence as a percentage. Because this format uses only 16 bits, it may be stored as a short; however, because only 9 bits are used to represent colors, only $2^9=512$ colors may appear in the color table with the remaining 7 bits used to specify the relative occurrence of the identified color. There are various formats that may be used to represent a relative occurrence in the 7-bit field. For example, the relative occurrence may be specified as a fixed-point value in 0.7 format or as an integer between 0 and 100. In other implementations, additional bits may be used to represent color by reducing the precision of the relative occurrences.

In practice, color feature vectors on average store information for approximately 3 distinct colors per image. If we use 9 bits to record color and 7 bits to record relative occurrences, we need 3*(9+7)=48 bits per color feature vector. Feature vectors may include descriptors for as few as 1 color up to a maximum, such as, 16 colors using from 16 bits to 256 bits depending on the color complexity of the image.

Alternatively, the data structure may store color selections for each color descriptor, and then the percentages for each corresponding color. If the expected length of the vector is less than $\log_2$ of the number of colors in the color table, then listing the indices would be most efficient. Otherwise, the data structure can use a bit map, one bit for each color, to indicate which colors are present. The order of bits within the bit map may further indicate additional information such as precedence. A CBIR system using the compact, variable-length feature vectors described above allows a user to query the system to determine images similar to a query image in much the same fashion as conventional CBIR systems. The CBIR system accepts a query image from a user. The system uses the query image to create a query color feature vector in the manner described above. The query color feature vector is then compared to the color feature vectors in the feature vector data store.

Color feature vectors created using the techniques described above may be used in a wide variety of applications. For example, a color feature vector may be used as a signature of an image. Because the color content of an image is encoded in the feature vector, any change to the image is likely to change its color content. Therefore, the color feature vector may serve as some indication of the identity and/or integrity of the image.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

A number of implementations have been described. Nevertheless, it will be understood that various modifications may be made without departing from the spirit and scope of the invention. Accordingly, other implementations are within the scope of the following claims.

What is claimed is:

1. A system comprising:
   an image data store containing a plurality of images;
   a color feature vector data store including a variable-length color feature vector for each of the plurality of images in the image data store; and
   a computer program operable to
      receive an image having one or more colors;

estimate a number of colors that can be used to represent the received image so that one or more fuzzy error criteria are satisfied;

set a value of a variable to be the estimated number of colors and until a length of the color feature vector is determined:

apply a medium-cut quantizer to the received image to produce a quantized image having a number of colors that is equal to the current value of the variable;

calculate an error between the quantized image and the received image; and if the calculated error satisfies an error threshold, determine the length of color feature vector based on the current value of the variable; and if the calculated error does not satisfy the error threshold, increment the value of the variable; and generate a color feature vector that is representative of and specific to the received image, the color feature vector having the determined length.

2. The system of claim 1 wherein the color feature vectors are compact.

3. The system of claim 1 wherein the length of each of the variable-length color feature vectors is determined by the color complexity of the represented image.

4. The system of claim 1 wherein each variable-length color feature vector includes a color descriptor, the color descriptor comprising:

a color identifier; and
a relative color occurrence.

5. The system of claim 4 further comprising a global color table, wherein the color identifier references a color in the global color table.

6. The system of claim 5 wherein the global color table is calculated from a sample image data store by quantizing images in the sample image data store to determine a set of quantized image colors, and selecting colors for the global color table using the set of quantized image colors to minimize error across the sample image data store.

7. The system of claim 6 wherein the sample image data store is the image data store and the multiple images are all the images in the image data store.

8. The system of claim 5 wherein the global color table is a generic global color table that is not specific to the image data store.

9. The system of claim 4 wherein the color occurrence identifies the relative occurrence of colors in the image similar to the color represented by the color identifier.

10. The system of claim 9 wherein color similarities are determined by computing vector distances.

11. The system of claim 4 wherein colors in the image correspond to selected colors in the color feature vector.

12. The system of claim 4 wherein the color identifier is stored in a 9-bit field.

13. The system of claim 4 wherein the relative color occurrence is stored in a 7-bit field.

14. A computer-implemented method comprising:
receiving an image having one or more colors;
estimating a number of colors that can be used to represent the received image;
setting a value of a variable to be the estimated number of colors and until a length of the color feature vector is determined:
applying a medium-cut quantizer to the received image to produce a quantized image having a number of colors that is equal to the current value of the variable;

calculating an error between the quantized image and the received image; and if the calculated error satisfies an error threshold, determining the length of color feature vector based on the current value of the variable, and if the calculated error does not satisfy the error threshold incrementing the value of the variable; and generating a color feature vector that is representative of and specific to the received image, the color feature vector having the determined length.

15. The method of claim 14 wherein the color feature vector includes:

for each of the colors in the quantized image, a color element comprising:

a color identifier; and
the relative occurrence of colors in the quantized image corresponding to the color identifier.

16. The method of claim 14 wherein estimating the number of colors includes performing a logarithmic search for the number of colors.

17. The method of claim 16 wherein performing a logarithmic search for the number of colors includes performing a fuzzy binary search for the number of colors, the fuzzy binary search being based on one or more fuzzy error criteria.

18. The method of claim 17 wherein each of the one or more fizzy error criteria and the error threshold is based on a peak signal-to-noise ratio.

19. The method of claim 14, wherein generating the color feature vector includes:

quantizing the received image to a number of colors that is the current value of the variable; and
mapping colors of the quantized image to colors in a global color table.

20. The method of claim 19, wherein:
a non-linear filter is applied to the received image before the received image is quantized to the number of colors on which the determination of the length of the color feature vector is based.

21. The method of claim 19, wherein mapping colors includes:

generating an inverse color table that maps indices from an original color space of the received image to a color space of the quantized image; and generating an inverse color table that maps indices from the color space of the quantized image to indices of a global color table.

22. The method of claim 19, further comprising:
dropping a color that occurs in less than a threshold number of pixels of the quantized image.

23. The method of claim 19, wherein the global color table is generated by:

applying a medium-cut quantizer to a collection of images to quantize images of the collection, the quantizer being subject to one or more rate distortion criteria; and
using a vector quantizer to generate the global color table, the global color table minimizing a mean standard error over the collection of images.

24. The method of claim 23, wherein:
the collection of images is stored in a data store of images.

25. The method of claim 14, further comprising:
comparing the received image to another image, the comparing being based on the feature color vector generated for the received image.

26. The method of claim 14, further comprising:
associating the generated color feature vector with the quantized image.

27. A computer-program product, tangibly stored on machine-readable medium, the product comprising instructions to cause a processor to:
- receive an image having one or more colors;
- estimate a number of colors that can be used to represent the received image so that one or more fuzzy error criteria are satisfied;
- set a value of a variable to be the estimated number of colors and until a length of the color feature vector is determined:
  - apply a medium-cut quantizer to the received image to produce a quantized image having a number of colors that is equal to the current value of the variable;
  - calculate an error between the quantized image and the received image; and
  - if the calculated error satisfies an error threshold, determine the length of color feature vector based on the current value of the variable, and if the calculated error does not satisfy the error threshold, increment the value of the variable; and
- generate a color feature vector that is representative of and specific to the received image, the color feature vector having the determined length.

28. The product of claim 27 wherein instructions to estimate the number of colors include instructions to perform a logarithmic search for the number of colors.

29. The product of claim 28 wherein instructions to perform a logarithmic search for the number of colors include instructions to perform a fuzzy binary search for the number of colors, the fuzzy search being based on one or more fuzzy error criteria.

30. The product of claim 29 wherein each of the one or more fuzzy error criteria and the error threshold is based on a peak signal-to-noise ratio.

31. The product of claim 27, wherein instructions to generate the color feature vector include instructions to:
- quantize the received image to a number of colors that is the current value of the variable; and
- map colors of the quantized image to colors in a global color table.

32. The product of claim 31, wherein:
- a non-linear filter is applied to the received image before the received image is quantized to the number of colors on which the determination of the length of the color feature vector is based.

33. The product of claim 31, wherein instructions to map colors include instructions to:
- generate an inverse color table that maps indices from an original color space of the received image to a color space of the quantized image; and
- generate an inverse color table that maps indices from the color space of the quantized image to indices of a global color table.

34. The product of claim 31, further comprising instructions to:
- drop a color that occurs in less than a threshold number of pixels of the quantized image.

35. The product of claim 31, further comprising instructions to:
- applying a medium-cut quantizer to a collection of images to quantize images of the collection, the quantizer being subject to one or more rate distortion criteria; and
- using a vector quantizer to generate the global color table, the global color table minimizing a mean standard error over the collection of images.

36. The product of claim 35, wherein;
the collection of images is stored in a data store of images.

37. The product of claim 27, further comprising instructions to:
- compare the received image to another image, the comparing being based on the feature color vector generated for the received image.

38. The product of claim 27, further comprising instructions to:
- associate the generated color feature vector with the quantized image.

* * * * *

UNITED STATES PATENT AND TRADEMARK OFFICE
CERTIFICATE OF CORRECTION

PATENT NO. : 6,961,736 B1
DATED : November 1, 2005
INVENTOR(S) : Sohrab Amirghodsi It is certified that error appears in the above-identified patent and that said Letters Patent is hereby corrected as shown below:

<u>Column 12,</u>
Line 6, add a comma after "threshold";
Line 27, delete "fizzy" and replace with "fuzzy".

Signed and Sealed this

Ninth Day of May, 2006

JON W. DUDAS
*Director of the United States Patent and Trademark Office*